Patented Feb. 10, 1942

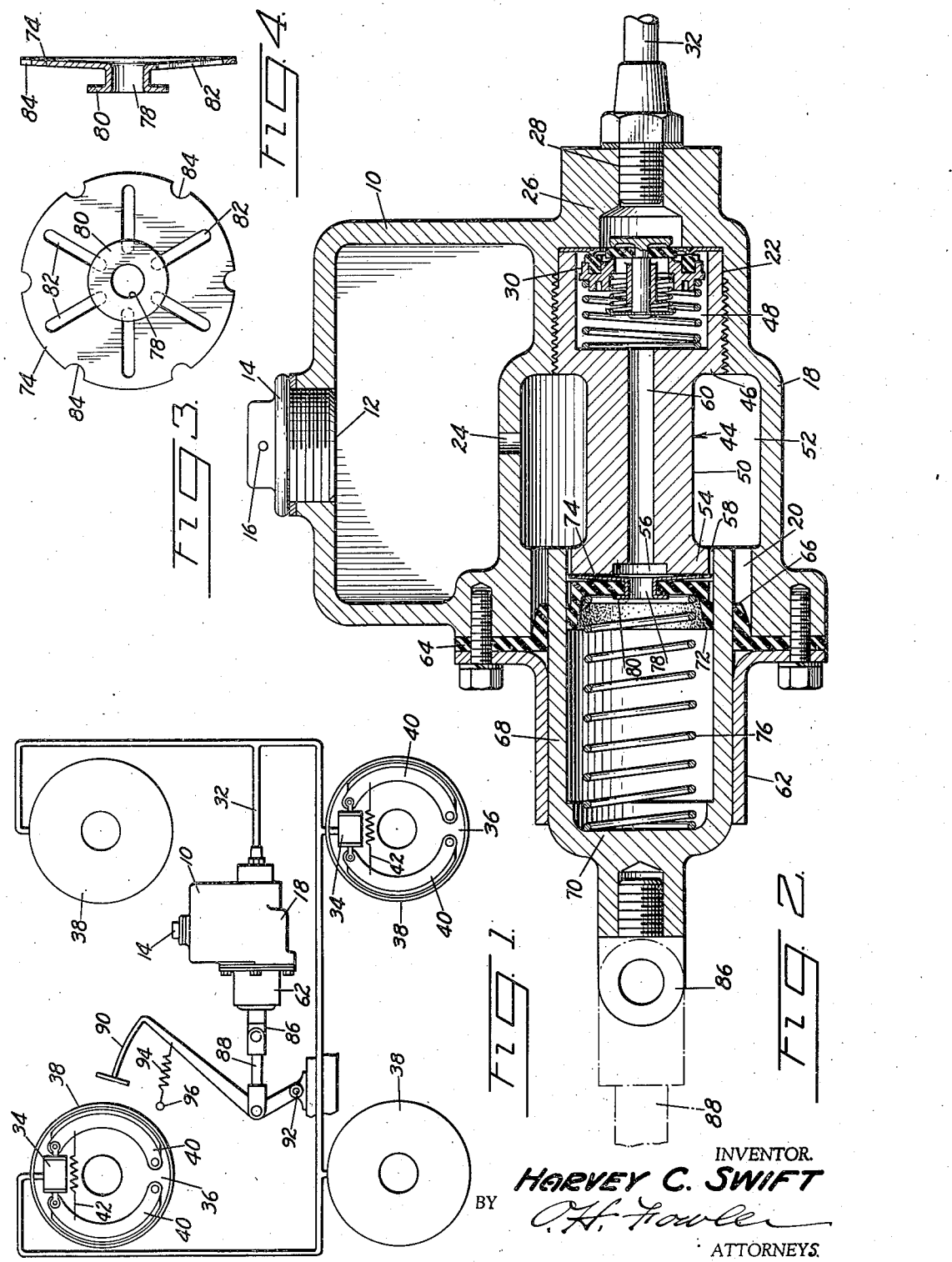

2,272,359

UNITED STATES PATENT OFFICE 2,272,359

FLUID PRESSURE BRAKING SYSTEM

Harvey C. Swift, Detroit, Mich., assignor to Hydraulic Brake Company, Detroit, Mich., a corporation of California Application May 2, 1938, Serial No. 205,638

12 Claims. (Cl. 60—54.6)

This invention relates to fluid pressure braking systems, and more particularly to fluid pressure producing devices for such systems.

Broadly the invention comprehends a fluid pressure producing device including a cylinder, a piston for cooperation therewith, and a sealing means for the piston operative to by-pass fluid during the retraction stroke, and when at rest.

An object of the invention is to provide an improved sealing means for a piston.

Another object of the invention is to provide a cushioned support for a sealing cup.

A further object of the invention is to provide a sealing cup, and a flexible perforated support for the cup.

Yet a further object of the invention is to provide a sealing means for a piston including a flexible perforated support and a flexible sealing cup interlocked with the support.

Other objects of the invention will appear from the following description taken in connection with the drawing forming a part of this specification, and in which, Fig. 1 is a diagrammatical illustration of a fluid pressure braking system embodying the invention;

Fig. 2 is a vertical sectional view of the fluid pressure producing device;

Fig. 3 is a top plan view of a support for the sealing cup; and

Fig. 4 is a sectional view of the support for the sealing cup.

Referring to the drawing for more specific details of the invention, 10 represents a reservoir having a filling opening 12 normally closed as by a plug 14 having openings 16 for venting the reservoir to the atmosphere.

A cylinder 18 formed at the base of the reservoir includes a large chamber 20 and a relatively small chamber 22 arranged in concentric relation to and communicating directly with the large chamber. The large chamber 20 has in its wall a port 24 providing a communication between the large chamber and the reservoir, and the outer end of the small chamber is closed as by a head 26 provided with a discharge port 28 controlled as by a two-way valve 30.

A fluid pressure delivery pipe or conduit 32 connected to the discharge port 28 has branches connected respectively to fluid pressure actuated motors 34 arranged in pairs, one pair for actuating brakes associated with the front wheels of a vehicle, and another pair for actuating the brakes associated with the rear wheels of the vehicle.

The brakes, which may be of any conventional type, preferably include a fixed support or backing plate 36 adapted to be secured to an axle or to an axle housing, a rotatable drum 38 associated with the backing plate adapted to be secured to a wheel, a pair of corresponding interchangeable friction elements or shoes 40 arranged on the backing plate for cooperation with the drum, a retractile spring 42 connecting the shoes, and a motor corresponding to the motors 34 mounted on the backing plate between the shoes and operative to actuate the shoes into engagement with the drum against the resistance of the retractile spring.

A fixed piston 44, supported in the small chamber 22 and extending concentrically into the large chamber 20 of the cylinder 18, includes a hollow cylindrical shank 46 secured in the small chamber 22 so as to provide a valve chamber 48 for the two-way valve 30, a body portion 50 of reduced diameter providing in conjunction with the wall of the large chamber 20 an annular chamber 52 communicating with the reservoir by way of port 24, and a head 54 having a centrally disposed recess 56 and a plurality of spaced passages 58 therethrough. A passage 60 extending through the body portion of the piston connects the valve chamber 48 and the recess 56 in the head of the piston.

A sleeve 62 of less diameter than the diameter of the chamber 20 is suitably secured to the outer end of the cylinder 18 in concentric relation thereto, and a washer 64 interposed between the sleeve and the cylinder has upon its inner perimeter a sealing cup 66.

A cylinder 68 closed at one end as by a head 70 and open at its other end is mounted for reciprocation in the sleeve 62 and is embraced by the sealing cup 66 so as to inhibit seepage of fluid from the chamber 52. This cylinder receives the piston 44, and a sealing cup 72 yieldingly supported on the head of the piston by a flexible perforated disk or support 74 is held against displacement by a light spring 76 interposed between the cup and head 70. This spring has only sufficient tension to retain the sealing cup against displacement,—hence the yielding support 74 for the sealing cup is normally under a very light load.

As shown, the flexible concavo-convex disk 74 has a centrally disposed sleeve 78 provided with a radial flange 80, and the body of the disk has a plurality of radial slots 82 and peripheral notches 84. The slots 82 constitute a by-pass passageway leading from the recess outlet 56 of the axial passageway 60 through the supporting disk 74 between the head 54 of the piston and the sealing cup 72 and establish communication between the passageway 60 and the reservoir around the head of the piston. The sleeve 78 is fitted into an axial opening in the base of the cup, and the flange 80 engages the inner perimeter of the cup defining the opening, so as to interlock the support and cup. Normally, the resilient disk 74 supports the sealing cup 72 in spaced relation to the head of the piston 44 so as to establish communication between the axial passage 60 through the piston and the annular chamber 52, and thus provides for expansion and contraction of the fluid in the system.

The head 70 of the cylinder 68 has secured thereto an I-bolt 86 connected as by a rod 88 to a foot pedal lever 90 pivotally mounted on a stub shaft 92 and connected by a retractile spring 94 to a fixed support 96.

In a normal operation, upon depressing the foot pedal lever 90, force is transmitted therefrom through the rod 88 to the cylinder 68, resulting in moving the cylinder on its compression stroke. During the initial movement of the cylinder 68, pressure created on the fluid therein forces the sealing cup 72 to its seat against the resistance of the flexible support 74, and thereafter as the piston advances on its compression stroke fluid is displaced from the cylinder 68, through the passage 60 in the piston and the valve chamber 48, past the two-way valve 30, thence through the discharge port 28 and fluid pressure delivery pipe 32 and the respective branches thereof into the fluid pressure actuated motors 34. This operation results in energization of the motors 34, causing movement of the shoes 40 of the respective brakes into engagement with the drum 38 against the resistance of the retractile spring 42, resulting in effectively retarding rotation of the drum.

Upon conclusion of a braking operation, the operator releases the foot pedal lever 90, whereupon the lever is returned to its retracted position under the influence of the retractile spring 94, and when the foot pedal lever returns to its retracted position, the cylinder 68 connected to the lever by the rod 88 is moved to its retracted position. This results in release of pressure on the fluid, and under this condition the sealing cup 72 is moved from its seat under the influence of the yelding support 74.

As the cylinder 68 moves to its retracted position, fluid is drawn from the reservoir 10 through the port 24 into the annular chamber 52, thence through the passages 58 in the head of the piston 44, past the sealing cup 72, into the cylinder 68, completely filling the cylinder. During this operation fluid is returning to the cylinder 68 from the fluid pressure actuated motors 34 and the fluid pressure delivery pipes connecting the motors to the pressure producing device under the influence of the retractile springs 42 connecting the shoes 40 of the respective brakes.

The quantity of fluid received by the cylinder 68 may be in excess of the quantity required to completely fill the cylinder, and, under this condition, any excess fluid is returned to the reservoir through the perforated support 74, the passages 58 in the head of the piston, the annular chamber 52, and the port 24. When the system is at rest, the fluid therein may expand and contract according to temperature changes, and to compensate for such variations fluid may be displaced from the system into the reservoir, or drawn from the reservoir into the system, by way of the perforated support 74, the passages 58 in the head of the piston 44, the annular chamber 52, and the port 24.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,

1. In a fluid pressure producing device a sealing means comprising a flexible sealing cup having an axial opening, a perforated flexible convex support, a concentric sleeve on the support extending through the opening in the cup, and a flange on the sleeve embracing the cup, said support having a bypass opening therethrough.

2. In a fluid pressure producing device a sealing means comprising a flexible sealing cup having an axial opening and a marginal flange, a perforated concavo-convex disk having a concentric opening, a sleeve on the convex face of the disk registering with the opening therein and extending through the opening in the cup, and a flange on the sleeve engaging the cup, said disk formed to provide a by-pass between the disk and the cup.

3. In a fluid pressure producing device, a movable cylinder, a fixed piston therein having an axial passage therethrough, a sealing means for the piston including a convex perforated flexible support juxtaposing the head of the piston, and a flexible sealing cup interlocked with the support, said support formed to provide a by-pass between the piston head and sealing cup.

4. In a fluid pressure producing device, a movable cylinder, a fixed piston therein having an axial passage therethrough, a sealing means for the piston including a flexible perforated concavo-convex disk having an opening concentrically disposed to the passage in the piston, a sleeve on the convex face of the disk registering with the opening, said sleeve provided with a radial flange, and a flexible sealing cup embracing the sleeve beneath the flange.

5. In a fluid pressure producing device, a reservoir, a cylinder supplied therefrom, a fixed piston in the cylinder having a passage therethrough, a movable cylinder supported for reciprocation in the cylinder, said movable cylinder receiving the piston, and a sealing means supported on the head of the piston including a concavo-convex disk having an axial opening concentrically disposed to the passage in the piston, a sleeve on its convex face provided with a flange, and a flexible cup embracing the sleeve and engaging the flange.

6. In a fluid pressure producing device, a reservoir, a cylinder supplied therefrom, said cylinder open at one end and closed at its other end by a head having a discharge port, a fixed piston in the cylinder having a chamber therein and a passage extending from the chamber through the piston, a valve in the chamber controlling the discharge port, a movable cylinder in the open end of the cylinder, the piston having passages through the head thereof providing communications between the cylinders, said movable cylinder receiving the piston, a sealing means on the piston for control of the communications including a concavo-convex perforated flexible disk having a concentric opening registering with the passage, a sleeve on the convex face of the disk registering with the opening in the disk, a flange on the sleeve, and a flexible cup on the sleeve engaged by the flange.

7. In a fluid pressure producing device, a reservoir, a cylinder supplied therefrom, said cylinder closed at one end by a head having a discharge port and open at its other end, a fixed piston in the cylinder having a chamber therein and a passage extending from the chamber through the piston, a two-way valve in the chamber for control of the discharge port, a movable cylinder supported for reciprocation in the open end of the cylinder and receiving the piston, the piston having passages through its head providing communications between the cylinders, a sealing means between the cylinder and the movable cylinder, and a sealing means on the head of the piston for control of the communications including a concavo-convex perforated flexible disk having a concentric opening and a sleeve registering with the opening having a flange, and a flexible cup on the sleeve engaged by the flange.

8. In a fluid pressure producing device, a reservoir, a cylinder supplied therefrom, said cylinder being closed at one end by a head having a discharge port and open at its other end, a fixed piston in the cylinder having a chamber in one end thereof and a passage extending from the chamber through the piston, a two-way valve in the chamber for control of the discharge port, a head on the other end of the piston having ports therethrough, a sleeve attached to the open end of the cylinder concentrically thereto, a sealing cup clamped between the sleeve and the cylinder, a reciprocable cylinder in the sleeve receiving the piston, and a sealing means on the head of the piston for control of the passages through the head thereof including a concavo-convex perforated flexible disk having an axial opening, a sleeve on the convex face of the disk registering with the opening, a flange on the sleeve, and a sealing cup embracing the sleeve and engaged by the flange.

9. In a fluid pressure producing device, a reservoir, a movable cylinder in communication with the reservoir, a piston therein having an axial passage therethrough, a sealing means for the piston comprising a deformable disc on the head of the piston having radially extended passages therein providing communication between the axial passage and the reservoir, a centrally disposed sleeve on the disc provided with a radial flange and registering with the passage in the piston, and a flexible cup embracing the sleeve beneath the flange.

10. In a fluid pressure producing device, in combination, a movable cylinder, a piston therein having a passage therethrough, a sealing and fluid passage means for the piston including a compressible perforated support on the head of the piston having an opening registering with the passage and radial slots communicating with the passage and extending toward the perimeter of the support, and a sealing cup interlocked with the support, said sealing cup provided with an opening corresponding to the opening in the support.

11. In a fluid pressure producing device, a reservoir, a fluid cylinder, a piston therein having a passageway therethrough, sealing means juxtaposing the head of the piston and having a passageway therethrough registering with the passageway through the piston, said sealing means including a sealing cup and a resilient support for the cup interposed between the cup and the head of the piston, a spring urging the cup against the support and toward the head of the piston, said resilient support normally overcoming said spring and spacing the cup from the head of the piston a distance greater than the thickness of the support, said support having an opening providing a fluid passageway between the cup and the head of the piston and establishing communication between the passageway through the piston and the reservoir.

12. In a fluid pressure producing device, a reservoir, a fluid cylinder in communication with the reservoir, a piston therein having a passageway therethrough, sealing means juxtaposing the head of the piston and having a passageway therethrough registering with the passageway through the piston, said sealing means including a sealing cup and a resilient support for the cup interposed between the cup and the head of the piston and responsive to fluid pressure against the cup to seal against the head of the piston but shaped to normally hold the cup spaced from the head of the piston a distance greater than the thickness of the support and providing a by-pass passageway communicating between the passageway in the piston and the reservoir.

HARVEY C. SWIFT.